(12) United States Patent
Polak et al.

(10) Patent No.: US 12,523,728 B2
(45) Date of Patent: Jan. 13, 2026

(54) METHODS FOR ACQUIRING A MAGNETIC RESONANCE IMAGE DATASET AND FOR GENERATING A MOTION-CORRECTED IMAGE DATASET

(71) Applicants: Daniel Polak, Erlangen (DE); Daniel Nicolas Splitthoff, Uttenreuth (DE); Stephen Farman Cauley, Winchester, MA (US)

(72) Inventors: Daniel Polak, Erlangen (DE); Daniel Nicolas Splitthoff, Uttenreuth (DE); Stephen Farman Cauley, Winchester, MA (US)

(73) Assignees: THE GENERAL HOSPITAL CORPORATION, Boston, MA (US); SIEMENS HEALTHINEERS AG, Forchheim (DE)

(*) Notice: Subject to any disclaimer, the term of this patent is extended or adjusted under 35 U.S.C. 154(b) by 210 days.

(21) Appl. No.: 18/122,820

(22) Filed: Mar. 17, 2023

(65) Prior Publication Data

US 2023/0293039 A1    Sep. 21, 2023

(30) Foreign Application Priority Data

Mar. 17, 2022    (EP) .................................. 22162679

(51) Int. Cl.
    *G01R 33/567*    (2006.01)
    *A61B 5/055*    (2006.01)
    *G06T 7/00*    (2017.01)

(52) U.S. Cl.
    CPC .......... *G01R 33/5676* (2013.01); *A61B 5/055* (2013.01); *G06T 7/0012* (2013.01)

(58) Field of Classification Search
    CPC ......... A61B 5/055; G06T 7/0012; G06T 5/00; G01R 33/5611; G01R 33/4818; G01R 33/543; G01R 33/5615; G01R 33/5676
    USPC ........................................................ 324/309
    See application file for complete search history.

(56) References Cited

U.S. PATENT DOCUMENTS

| | | | |
|---|---|---|---|
| 2007/0249929 A1 | 10/2007 | Jeong et al. | |
| 2019/0004132 A1* | 1/2019 | Tan | G01R 33/56 |
| 2019/0035119 A1* | 1/2019 | Cauley | G06T 7/13 |
| 2020/0300947 A1* | 9/2020 | Wang | G01R 33/4818 |

(Continued)

OTHER PUBLICATIONS

Bilgic, Berkin, et al. "Wave-CAIPI for highly accelerated 3D imaging." Magnetic resonance in medicine 73.6 (2015): 2152-2162.

(Continued)

*Primary Examiner* — Judy Nguyen
*Assistant Examiner* — Robert P Alejnikov, Jr.
(74) *Attorney, Agent, or Firm* — Lempia Summerfield Katz LLC

(57) ABSTRACT

A method for acquiring a magnetic resonance image dataset of an object includes using an imaging protocol in which a number of k-space lines are acquired in one shot. The imaging protocol includes a plurality of shots. A plurality of additional k-space lines are acquired in at least a subset of the shots, such that movement of the object is detected throughout the imaging protocol. A method for generating a motion-corrected magnetic resonance image dataset from the dataset thus acquired, a magnetic resonance imaging apparatus, and a computer program are also provided.

18 Claims, 5 Drawing Sheets

(56) References Cited

U.S. PATENT DOCUMENTS

2020/0300957 A1* 9/2020 Chen .................. G01R 33/5608
2021/0373105 A1 12/2021 Polak et al.

OTHER PUBLICATIONS

Cordero-Grande, Lucilio, et al. "Sensitivity encoding for aligned multishot magnetic resonance reconstruction." IEEE Transactions on Computational Imaging 2.3 (2016): 266-280.

Cordero-Grande, Lucilio, et al. "Motion-corrected MRI with DISORDER: distributed and incoherent sample orders for reconstruction deblurring using encoding redundancy." Magnetic Resonance in Medicine 84.2 (2020): 713-726.

Cordero-Grande, Lucilio, et al. "Three-dimensional motion corrected sensitivity encoding reconstruction for multi-shot multi-slice MRI: application to neonatal brain imaging." Magnetic resonance in medicine 79.3 (2018): 1365-1376.

Hamilton, Jesse, Dominique Franson, and Nicole Seiberlich. "Recent advances in parallel imaging for MRI." Progress in nuclear magnetic resonance spectroscopy 101 (2017): 71-95.

Haskell, Melissa W., et al. "Network accelerated motion estimation and reduction (NAMER): convolutional neural network guided retrospective motion correction using a separable motion model." Magnetic resonance in medicine 82.4 (2019): 1452-1461.

Haskell, Melissa W., Stephen F. Cauley, and Lawrence L. Wald. "TArgeted Motion Estimation and Reduction (TAMER): data consistency based motion mitigation for MRI using a reduced model joint optimization." IEEE transactions on medical imaging 37.5 (2018): 1253-1265.

Polak, Daniel, et al. "Scout accelerated motion estimation and reduction (SAMER)." Magnetic Resonance in Medicine 87.1 (2022): 163-178.

Pruessmann, Klaas P., et al. "SENSE: sensitivity encoding for fast MRI." Magnetic Resonance in Medicine: An Official Journal of the International Society for Magnetic Resonance in Medicine 42.5 (1999): 952-962.

* cited by examiner

METHODS FOR ACQUIRING A MAGNETIC RESONANCE IMAGE DATASET AND FOR GENERATING A MOTION-CORRECTED IMAGE DATASET

This application claims the benefit of European Patent Application No. EP 22162679.9, filed on Mar. 17, 2022, which is hereby incorporated by reference in its entirety.

BACKGROUND

The present embodiments relate to a method for acquiring a magnetic resonance image dataset of an object, and to a method for generating a motion-corrected image dataset from k-space data acquired during such a method. The present embodiments also relate to a magnetic resonance imaging apparatus and a computer-readable medium.

Patient motion may degrade the diagnostic quality of magnetic resonance (MR) exams. Fast imaging protocols may reduce the impact of motion. For example, parallel imaging techniques, as summarized in J. Hamilton, D. Franson, and N. Seiberich "*Recent Advances in Parallel Imaging for MRI*," Prog. Nucl. Magn. Reson. Spectrosc., vol. 101, pp. 71-95, 2017, exploit the properties of modern multi-channel coil arrays to separate aliased pixels in the image domain or to estimate missing k-space data, using knowledge of nearby acquired k-space points, in order to allow scan time reduction by sampling a smaller number of phase encoding lines in k-space.

Some Magnetic resonance imaging (MRI) motion correction techniques involve measuring the motion by tracking devices or navigator acquisitions.

By contrast, retrospective methods correct for motion artefacts after the data acquisition without disruptions to the sequence timing or inclusion of additional hardware. By including motion operations into the MR forward model, these techniques account for the patient's motion in the final image reconstruction and therefore reduce motion artefacts through improved model agreement. Especially data-driven retrospective correction techniques allow for the motion data to be derived from the acquired k-space data itself. In the case of parallel imaging, this is facilitated because the complex sensitivity profiles of multi-channel coil arrays inherently encode the patient position into the acquired k-space data. For multi-shot acquisitions, the goal in retrospective motion correction techniques is to extract the per shot rigid-body motion parameters and the motion-free image simultaneously. This may be accomplished by either minimizing an image quality metric, such as image entropy, or by minimizing the data consistency error of a parallel "imaging+motion" forward model, as described in L. Cordero-Grande, E. J. Hughes, J. Hutter, A. N. Price, and J. V Hajnal, "*Three-dimensional motion corrected sensitivity encoding reconstruction for multi-shot multi-slice MRI: Application to neonatal brain imaging*," Magn. Reson. Med., vol. 79, no. 3, pp. 1365-1376, 2018, J. Cordero-Grande, L., Teixeira, R., Hughes, E., Hutter, J., Price, A., & Hajnal, "*Sensitivity Encoding for Aligned Multishot Magnetic Resonance Reconstruction*," IEEE Trans. Comput. Imaging, vol. 2, no. 3, pp. 266-280, 2016 and M. W. Haskell, S. F. Cauley, and L. L. Wald, "*TArgeted Motion Estimation and Reduction (TAMER): Data consistency based motion mitigation for mri using a reduced model joint optimization*," IEEE Trans. Med. Imaging, vol. 37, no. 5, pp. 1253-1265, 2018. For the latter, the motion and image vector are jointly estimated via an inversion of the non-linear forward model. This corresponds to a large-scale non-linear optimization problem that is typically computationally very expensive. Previously proposed methods alternate between optimizing just the image or the motion parameters while assuming the other to be fixed (see L. Cordero-Grande in Magn. Reson. Med.), instead of updating all optimization variables at once. Repeated updates of the imaging voxels lead to excessive computation that prohibits its use in clinical settings. When the "imaging+motion" model and the underlying imaging protocol also includes parallel imaging techniques that make use of the complex sensitivity profiles of multi-channel coil arrays, such as SENSE (SENSitivity Encoding) or ASSET (Array coil Spatial Sensitivity Encoding) (e.g., referred to as "SENSE+motion" model).

In "Scout accelerated motion estimation and reduction (SAMER)," Magn. Reson. Med., vol. 87, pp. 163-178, 2022, D. Polak, D. N. Splitthoff, B. Clifford, W.-C. Lo, S. Huang, J. Conklin, L. L. Wald, K. Setsompop and S. Cauley propose a technique that utilizes a single rapid scout scan to drastically reduce the computation cost of motion estimation.

It has been found that the robustness and speed of retrospective motion estimation may be further improved by using optimized encoding reordering schemes for rectilinear three-dimensional (3D) multi-shot acquisitions. "Reordering scheme" or "sampling order" may refer to the order in which k-space lines are acquired (e.g., the pattern in which the k-space is sampled, such as linear or radial). For example, L. Cordero-Grande, G. Ferrazzi, R. P. A. G. Teixeira, J. O'Muircheartaigh, A. N. Price, and J. V. Hajnal, "*Motion-corrected MRI with DISORDER: Distributed and incoherent sample orders for reconstruction deblurring using encoding redundancy*," Magn. Reson. Med., vol. 84, pp. 713-726, 2020, propose a jittered checkerboard reordering scheme for 3D acquisitions (referred to herein as "checkered"). By uniformly distributing the samples of each shot across k-space, this reordering was shown to have computational advantages, including improved convergence stability and speed.

However, these distributed reorderings may lead to artefacts in the image domain.

SUMMARY AND DESCRIPTION

The scope of the present invention is defined solely by the appended claims and is not affected to any degree by the statements within this summary.

The present embodiments may obviate one or more of the drawbacks or limitations in the related art. For example, a method of acquiring a magnetic resonance image dataset of an object that allows robust and fast-converging retrospective motion correction, while at the same time avoiding the disadvantages of a distributed reordering such as "checkered" is provided. As another example, a method of acquiring an MRI dataset of an object that allows robust and fast-converging retrospective motion correction, and provides more homogeneous contrast and/or better spatial resolution than the prior art acquisition methods is provided. It yet another example, a navigator-free retrospective motion estimation technique that facilitates clinically acceptable (e.g., less than 1 min.) computation time for clinical protocols running on standard clinical reconstruction hardware is provided.

In one embodiment, a method for acquiring a magnetic resonance image dataset of an object using an imaging protocol in which spatial encoding is performed using phase encoding gradients along at least one spatial dimension, and frequency encoding gradients along another spatial dimension is provided. K-space is sampled during the acquisition in a plurality of k-space lines oriented along the frequency encoding direction. A number of k-space lines are acquired in one shot. The imaging protocol includes a plurality of shots. According to the method, a plurality of additional k-space lines are acquired in at least a subset of the plurality of shots, such that movement of the object is detected at pre-determined intervals throughout the imaging protocol.

Distributed reorderings, such as "checkered", lead to more severe manifestations of motion artefacts. For example, for the same level of motion, distributed reorderings exhibit more artefacts than standard linear reorderings. This is because a sudden movement of the object leads to impairment of the currently acquired k-space data: Rotation of the object (e.g., the patient's head) will lead to a rotated k-space. A translation of the subject's head, for example, will cause a phase ramp in k-space. In a linear or other "smooth" sampling order, this will lead to a single gap in k-space. In a distributed sampling order such as "checkered", this will lead to multiple repetitive gaps in k-space, which may translate into ghosts in the reconstructed image. The artefacts are particularly pronounced in the non-motion-corrected images, but may also persist in the retrospectively motion-corrected images, because the gaps in k-space are such that the missing information cannot be compensated for. For example, distributed sampling schemes hamper the image voxel estimation in SENSE+motion reconstructions due to the mixing of all shots/motion states in every local neighborhood of k-space. This results in repetitive gaps in k-space and loss of spatial resolution, as well as poor image homogeneity in the image domain.

By contrast, linear sampling is more favorable for SENSE+motion reconstructions. However, since motion may best be tracked in the k-space center, the lack of k-space center information in every shot impedes accurate motion estimation. A distributed sampling order, such as "checkered", in which k-space is sampled so that each shot contains samples that are distributed over k-space, including the central region, allows better motion estimation. To bridge the image quality gap between distributed sampling orders and pure linear or other conventional sampling orders, a reordering scheme of the present embodiments (e.g., "LINEAR+") is provided. Here, imaging with a conventional reordering (e.g., linear) is combined with a set of additional k-space lines, which may be disposed in a central region of k-space. These additional k-space lines are also referred to as "calibration samples", as the additional k-space lines may be used for motion estimation and may be discarded during the "imaging+motion" (e.g., "SENSE+motion") reconstruction to avoid reconstruction instabilities. In an embodiment, the additional k-space lines are only used for motion estimation. The additional k-space lines may also be used for image reconstruction, although the additional k-space lines may not be used because the additional k-space lines contain redundant information in this reconstruction step. However, the additional k-space lines are important for motion estimation, because for this purpose, it is useful to have some areas of k-space (e.g., at the center) sampled at regular intervals, such as in every shot or in a subset of the shots (e.g., every second, third, fourth, of fifth shot).

The additional k-space lines may be considered as redundant samples, in that these k-space positions are sampled again in each shot or in each of a subset of shots. The additional k-space lines may constitute only a small percentage of the overall k-space lines that are sampled during the execution of the imaging protocol (e.g., 0.5% to 5%; 1% to 3%) of the total number of sampled k-space lines.

The method of the present embodiments may be executed on any medical or other MRA apparatus. The object may be an MRI phantom or a part of the human or animal body (e.g., part of a patient to be examined).

The imaging protocol may be any MRI imaging protocol or sequence in which a number of k-space lines are acquired in each of a plurality of shots. A "shot" may include a plurality of MR echoes (e.g., spin-echoes and/or gradient echoes). One k-space line may be acquired during one echo, and there may be, for example, 8 to 512 echoes in one shot (which may also be referred to as echo train). For example, in three-dimensional (3D) turbo spin-echo sequences, there may be 64 to 256 echoes in one shot; in two-dimensional (2D) turbo spin-echo sequences, an echo train may typically contain less than 20 echoes. The imaging protocol may use a multi-shot method, in which a fraction of k-space is sampled in one shot. The imaging protocol may include, for example, between 5 and 300 shots, depending on whether it is 2D or 3D. A shot may be acquired after a single radio frequency (RF) excitation. Examples of such imaging protocols are fast spin-echo sequences, also termed SPACE ("sampling perfection with application of optimized contrast using flip angle evolution") or MPRAGE ("magnetization prepared rapid gradient echo"), which uses an inversion preparation followed by gradient echoes. A 2D imaging protocol such as 2D Turbo Spin-Echo may also be used. Further, the present embodiments may also be used on steady state sequences, such as gradient recalled echo (GRE). The additional k-space lines may be acquired at the same time position in each of the shots or subset of shots (e.g., always at the beginning of the shot, always at the end of the shot, or approximately in the middle of the; within ±15% from the middle).

The imaging protocol may be a two-dimensional (2D) or three-dimensional (3D) imaging protocol. In a 2D-imaging protocol, a slice of the object may be selected during RF excitation using a slice-select gradient. During each shot, the k-space plane is sampled by using a phase encode gradient along one dimension and a frequency encoding gradient along another spatial dimension. In a 3D-imaging protocol, a thick slab of tissue is excited together. In such 3D-imaging, spatial encoding may be performed using phase-encoding gradients along two spatial dimensions, and frequency encoding along the third spatial dimension, referred to as readout direction. A k-space line may be oriented in the readout direction. Accordingly, with each MR echo, a k-space line oriented along the readout direction is sampled. By modifying the phase-encoding gradient before each readout, it is possible to design different sampling orders (also referred to as "reordering", "reordering pattern", "reordering scheme," or "reordering pattern"), which may refer to the order in which the k-space lines are acquired. For example, in a linear reordering, the phase-encoding gradient (s) is/are increased incrementally or step-by-step for each k-space line, resulting in a sampling of k-space line-by-line, from one end of k-space to the other.

A k-space line may be a straight line through k-space, but the k-space lines need not necessarily be acquired in a linear sampling order. The k-space lines may be straight k-space lines that are acquired one after the other in a radial, spiral or any other pattern (e.g., as viewed in the phase-encode plane).

The method of the present embodiments requires minimal modification of the imaging protocol and may be implemented in a variety of different imaging protocols, since the method is based on a standard clinical reordering scheme, where, for example, a small number of additional calibration samples are included into the echo train. Especially in combination with a low-resolution scout scan, these samples enable very rapid and accurate motion estimation by comparing the data consistency error in an "imaging+motion" or "SENSE+motion" model with the calibration samples (e.g., additional k-space lines) from each shot. These calibration samples may be discarded during the image reconstruction, since a standard clinical reordering, such as linear reordering, has better pixel estimation properties. The method of the present embodiments allows accurate motion estimation and at the same time minimizes adverse effects on image quality and sequence timings. This is possible because the additional calibration samples may be fully integrated into the echo train. By contrast, navigator techniques (e.g., vnavs) often rely on the acquisition of a separate EPI (echo-planar imaging) scan, or another low-resolution image, which are typically not integrated into the echo train. Instead, they are played either before or after the standard data acquisition, which may be disruptive to the sequence timing. For example, in MPRAGE, the additional scan time needed for these navigators may increase the minimal inversion time, which may affect the achievable contrast and image quality. Also, navigator techniques usually rely on registering the low-resolution images with one another in the image domain and thereby estimating the motion trajectory. In useful embodiments, the number of additional k-space lines acquired in one shot would not be sufficient to reconstruct an image and to estimate the motion trajectory in the image domain. For example, the acceleration factor would be about R=100.

It has been shown in experiments that the method of the present embodiments results in more homogeneous contrast and better spatial resolution than distributed reordering schemes (e.g., for clinically representative motion trajectories, such as sudden motion, as well as an oscillatory motion pattern caused by breathing).

In summary, the method of the present embodiments using LINEAR+ sampling scheme retains the favorable image acquisition and reconstruction properties from standard clinical reorderings, such as linear reorderings. These are, for example, low motion sensitivity, the preservation of clinical contrast, image blurring restricted to one spatial dimension (e.g., PAR in MPRAGE), and minimal effects from eddy currents because large jumps in k-space are avoided. Further, LINEAR+ may be implemented into any 2D- or 3D-sequence with minimal efforts needed for implementation and maintenance.

According to an embodiment, the position in the k-space of the additional k-space lines acquired in each shot or in each of the subset of shots is constant, or is varied slightly over the shots or the subset of shots. This provides that the additional k-space lines or calibration samples may be used to estimate the motion between each shot in which the additional k-space lines or calibration samples are acquired, by allowing comparison between the additional k-space lines or calibration samples. In one embodiment, the location of the additional k-space lines stays the same in each shot or each of the subset of shots. However, the location of the additional k-space lines may be slightly varied, as the additional k-space lines do not have to be the same all the time. In this context, a slight variation may provide a variation by ±5% or ±2% of the extension of k-space.

In an embodiment, the plurality of additional k-space lines are acquired once or a number of times in each shot of the imaging protocol. This allows a particularly closely spaced sampling of motion. For example, the plurality of additional k-space lines may be acquired once every shot/TR, where TR may vary depending on the imaging protocol (e.g., between about 100 ms to 800 ms in a FLASH (Fast Low Angle Shot) or T1 SPACE sequence, and a number of seconds in a SPACE-FLAIR sequence). However, the whole set of calibration samples may be acquired a number of times per shot/TR (e.g., the plurality of additional k-space lines may be acquired 2 to 5 times or 2 to 3 times in each shot). This allows the user to improve the temporal resolution for the motion estimate by at least 2-3-fold. For example, the plurality of additional k-space lines may be acquired every 100 to 1000 ms.

According to an embodiment, 2-16 or 4-8 additional k-space lines are acquired in each shot or in each of the subset of shots. The sampling density within the k-space region that is sampled by the additional k-space lines does not significantly affect the motion estimation accuracy. A low number of additional k-space lines is sufficient to achieve accurate motion estimation. In an example, using only four calibration samples (e.g., additional k-space lines) enables accurate motion parameter estimation with negligible error. It is beneficial to keep the number of additional k-space lines small, as these calibration samples are discarded or at least redundant for the image reconstruction and thus reduce the overall efficiency of the imaging sequence.

According to an embodiment, the acquisition of the additional k-space lines takes up 0.5% to 5% or 1% to 3%, for example, of a total acquisition time of the imaging protocol. This is due to the above-mentioned property of the present embodiments (e.g., that only very few additional k-space lines are sufficient to achieve the desired result). This may be used to limit the acquisition time taken up by the additional k-space lines.

In an embodiment, the imaging protocol provides for sampling of k-space in a sampling order in which the one or number of phase-encoding gradients are changed incrementally from one k-space line to the next, with the exception of the additional k-space lines. Thereby, jumps in k-space and adverse effects such as eddy currents are reduced. Further, jumps in k-space, such as in a distributed ordering, lead to more severe manifestations of motion artefacts, which the "SENSE+motion" reconstruction may not be able to fully correct for.

In an embodiment, k-space may be sampled in a linear, spiral or radial sampling order. In linear and radial sampling orders, the phase-encoding gradients may be changed incrementally from one k-space line to the next, to thereby smoothly sweep through k-space. This has the above-described advantages. A spiral re-ordering in 3D imaging is also possible.

The additional k-space lines may be acquired in the same way as the rest of the imaging protocol (e.g., in a linear sampling order). The additional k-space lines may also be linear, in a radial sampling order. The additional k-space lines may be oriented linearly, and in a spiral sampling order. Also, the additional k-space lines may be spiral. However, a mixture between these different sampling orders is also possible. For example, a spiral readout may be combined with linear additional k-space lines or vice versa.

In an embodiment, the additional k-space lines are disposed in the central region of k-space. In one embodiment, the central region is equivalent to a magnetic resonance image of low resolution, such as a scout image. For example, the central region of k-space may be equivalent to a low-resolution image having a pixel/voxel size of ≥3 mm or ≥4 mm (e.g., 3-7 mm or 4-6 mm). It has been demonstrated to be advantageous for the calibration samples to be chosen close to the k-space center, since low-frequency k-space information typically better captures the effect from patient motion than information from the k-space periphery. Further, in case the SAMER technique (Magn. Reson. Med., pp. 163-178, 2022) is used, the calibration samples may be chosen such that there is sufficient overlap between the scout and the calibration data (e.g., sufficient common frequency overlap). In other words, it is beneficial if the additional k-space lines cover the same region of k-space or a somewhat (e.g., up to 70%) smaller region in k-space than the scout image. The k-space region covered by the additional k-space lines, also termed "calibration region", should not be too small, since the motion estimation error rises sharply when the extent of the calibration region is too far reduced. In a simulation, it has been shown that the calibration region may extend over the central 0.1% to 15% or 0.5% to 5% of the overall k-space phase-encoding plane. In other words, in an example where the three-dimensional k-space was sampled by 256×256 k-space lines, the size of the calibration region may be between 10×10 and 30×30 (e.g., around 20×20) k-space lines in the center of k-space. However, these numbers vary as a function of the Field-of-View (FOV) size in mm (e.g., for larger FOV it is desirable to increase the extent of the calibration samples, for smaller FOV the opposite is true). These numbers refer to the overall extent of the calibration region, which is significantly undersampled (e.g., of all k-space lines in the calibration region, only about 1% to 20% are actually sampled).

In the case of three-dimensional imaging, the central calibration region may have the shape of a cylinder extending in readout direction. The cylinder cross-section (e.g., its shape in the phase-encode plane) may be square or rectangular, honeycomb, or diamond-shaped.

In an embodiment, the method further includes acquiring a low-resolution scout image of the object (e.g., a single low-resolution scout image). This single scout image may be used to estimate the motion trajectory (e.g., by comparing with the additional k-space lines acquired in each shot or in each of the subset of shots). Thus, the acquired data may be reconstructed using the SAMER-method. Similar to the central region of k-space, the low-resolution scout image may have a spatial resolution of 2-8 mm (e.g., 3-5 mm; 4 mm) in the phase encode plane. The scout image may cover at least approximately the calibration region of k-space. In embodiments, the scout covers a larger region in k-space than the calibration region (e.g., 150% to 300%; 200%). For example, the scout may cover 70% to 130% or 90 to 110% of the calibration region. The low-resolution scout image may be a 2D or 3D image that may be acquired with the same or a different imaging protocol than the 2D or 3D magnetic resonance image dataset. The scout scan may have a similar or slightly differing contrast to the imaging protocol. For example, the scout image may be acquired using parallel imaging accelerations of R=4 to R=12 at low spatial resolution of, for example, 1×4×4 mm$^3$.

When carrying out retrospective motion correction, the low-resolution scout image may be compared with the additional k-space lines to obtain the desired motion parameters. The additional k-space lines provides sufficient k-space overlap between the low-resolution scout and the high-resolution imaging data for every shot or each of a subset of shots to provide good motion estimation.

Therefore, the single low-resolution scout image (e.g., acquired in 2-6 sec using a 3D Turbo Spin-Echo sequence) may be used in retrospective motion correction in combination with the inventive additional k-space lines in order to completely avoid time-consuming joint optimization of motion and image vector. Therefore, this embodiment allows each motion state to be independently determined using fully separable motion optimizations across all shots (or subset of shots). In addition to the computational and stability benefits of this approach, it creates the possibility of performing "on-the-fly" motion estimation immediately after each shot. For the final image reconstruction, the individual motion states from each shot may be combined, and a standard least squares problem may be solved to obtain a motion-mitigated or motion-corrected image.

In an embodiment, the imaging protocol uses a 3D parallel imaging technique, in which one or both of the phase encoding directions are subsampled by a predetermined acceleration factor, and the image dataset is acquired using a multi-channel coil array. Accordingly, the subsampling pattern may be incorporated into the forward model (e.g., a "SENSE+motion" model). For example, Wave-CAIPI (as disclosed in B. Bilgic et al., "Wave-CAIPI for highly accelerated 3D imaging," Magn. Reson. Med., vol. 73, no. 6, pp. 2152-2162, 2015) may be used.

In another aspect, the present embodiments relate to a method for generating a motion-corrected magnetic resonance image dataset of an object. The method includes: receiving k-space data acquired using an imaging protocol, such as according to the acquisition method as described herein; and estimating the motion-corrected image dataset and the rigid-body motion parameters for each shot or each of a subset of shots by minimizing the data consistency error between the k-space data acquired in the imaging protocol and a forward model described by an encoding matrix. The encoding matrix includes the effects of rigid-body motion for each shot, Fourier encoding, and optionally subsampling and coil sensitivities of a multi-channel coil array.

Accordingly, the motion correction method may use imaging data acquired according to an acquisition method of the present embodiments. All features disclosed with regard to the acquisition method may be combined with all features of the motion-correction method and vice versa. Also, all features of the disclosed methods may be embodied in the MRI apparatus, computer program, and computer-readable storage medium according to other aspects of the present embodiments and vice versa. In one embodiment, the k-space data is multi-channel acquired using a multi-channel coil array. The image dataset may be 2D or 3D.

The retrospective motion correction may be carried out as described in the above-cited articles by M. W. Haskell (TAMER and NAMER) as well as by L. Cordero-Grande. The minimization problem is derived from a SENSE parallel imaging forward model, with rigid body motion parameters included. The SENSE forward model was introduced by K. P. Pruessmann, M. Weiger, M. B. Scheidegger, and P. Boesiger, "SENSE: sensitivity encoding for fast MRI," Magn. Reson. Med., vol. 42, no. 5, pp. 952-962, 1999.

In an embodiment, the method further includes receiving a low-resolution scout image of the object (e.g., acquired as described above). The minimization problem is carried out in two acts: in a first act, the rigid-body motion parameters for each shot are estimated using the low-resolution scout image and the additional k-space lines. In a second act, the motion-corrected image is estimated using the rigid-body motion parameters estimated in the first act. Thereby, alternating, repeated updates of the otherwise coupled optimization variables x (e.g., image vector) and θ (e.g., motion parameters) is avoided. Rather, this embodiment uses the rapid scout acquisition as an image estimate $\tilde{x}$. This leads to a highly efficient optimization problem that is fully separable across the shots and does not require repeated updates of x, which may include millions of imaging voxels. This optimization scheme profits substantially from the sampling order of the present embodiments, since there is substantial k-space overlap between the low-resolution scout image and the additional k-space lines acquired in every shot or each of a subset of shots, such that alternating optimization is completely avoided.

In an embodiment, the additional k-space lines are not used in the second act in order to retain a reordering scheme in which k-space is sampled such that the one or number of phase encoding gradients are changed incrementally from one k-space line to the next (e.g., purely linear reordering scheme). This is because such a reordering scheme has favorable properties in the "SENSE+motion" reconstruction.

In a further aspect of the present embodiments, a magnetic resonance imaging apparatus includes a radio frequency controller configured to drive an RF-coil (e.g., including a multi-channel coil-array, a gradient controller configured to control gradient coils, and a control unit configured to control the radio frequency controller and the gradient controller to execute the multi-shot imaging protocol). The MRI apparatus may be a commercially available MRI apparatus that has been programmed to perform the method of the present embodiments. For example, the MRI apparatus may be 3T scanner such as the MAGNETOM Vida of SIEMENS healthcare, Erlangen, Germany. A multi-channel coil array may, for example, be a 32-channel head coil, but may also be a coil array for spine-imaging.

According to a further aspect of the present embodiments, a computer configured to generate a motion-corrected magnetic resonance image dataset is provided. The computer includes: an interface configured to receive k-space data acquired in a multi-shot imaging protocol (e.g., according to the acquisition method described herein); and a processing unit configured to estimate the motion-corrected image dataset and the rigid-body motion parameters for each shot by minimizing the data consistency error between the (e.g., multi-channel) k-space data acquired in the multi-shot imaging protocol, including the additional k-space lines, and a forward model described by an encoding matrix. The encoding matrix includes the effects of rigid-body motion for each shot, Fourier encoding, and optionally subsampling and coil sensitivities of a multi-channel coil array.

The computer may be any computer including a sufficiently powerful processing unit, which may be a CPU or GPU, or a number of such processing units. Accordingly, the computer may be a PC, a server, a console of an MRI apparatus, but the computer may also be a computer that is remote from the MRI apparatus. The computer may be connected with the MRI apparatus through the Internet. Accordingly, the computer may also be a cloud computer, a remote server, etc. The computer may also be a mobile device, such as a laptop, tablet computer, or mobile phone.

According to a further aspect of the present embodiments, a computer program that includes program code that causes a magnetic resonance imaging apparatus, such as the apparatus described herein, to execute the method of the present embodiments (e.g., the method for acquiring an MR image dataset) is provided. However, the program code may also encode the described method for generating a motion-corrected magnetic resonance image dataset, and the program code may run on a computer as described herein.

According to a further aspect, the present embodiments are directed to a non-transitory computer-readable medium containing a computer program as described herein. The computer-readable medium may be any digital storage medium, such as a hard disc, a cloud, an optical medium such as a CD or DVD, a memory card such as a compact flash, memory stick, a USB-stick, multimedia stick, secure digital memory card (SD), etc.

BRIEF DESCRIPTION OF THE DRAWINGS

The accompanying drawings illustrate various example methods and other example embodiments of various aspects of the invention.

Similar elements are designated with same reference signs in the drawing.

DETAILED DESCRIPTION

Figure 1:
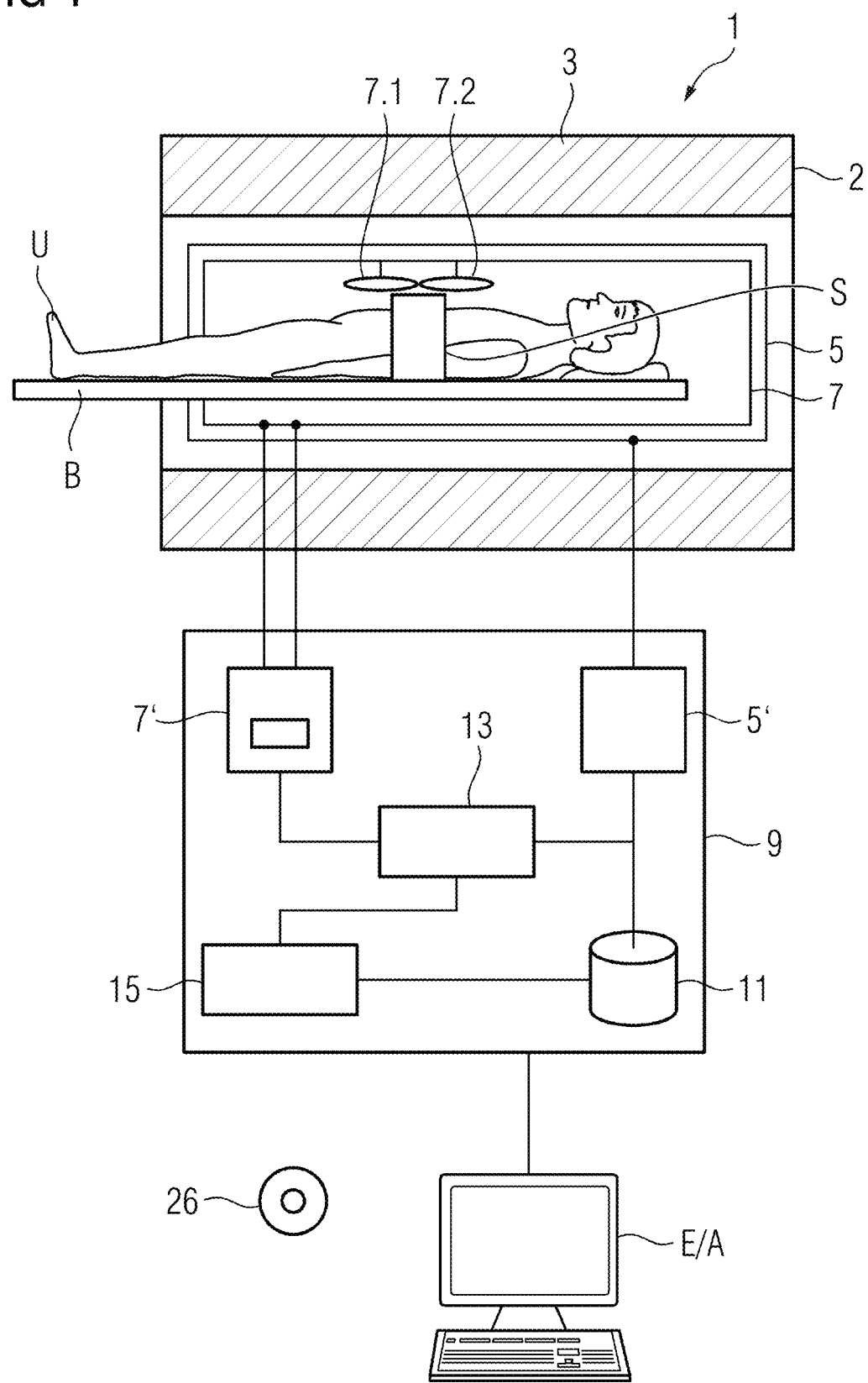
FIG. 1 is a schematic representation of a magnetic resonance imaging (MRI) apparatus according to an embodiment.

FIG. 1 schematically shows an embodiment of a magnetic resonance (MR) apparatus 1. The MR apparatus 1 has an MR data acquisition scanner 2 with a basic field magnet 3 that generates the constant magnetic field, a gradient coil arrangement 5 that generates the gradient fields, one or a number of radiofrequency (RF) antennas 7 for radiating and receiving radio-frequency signals, and a control computer 9 configured to perform an embodiment of a method. In FIG. 1, such sub-units of the magnetic resonance apparatus 1 are only outlined schematically. The radio-frequency antennas 7 may include a multi-channel coil array including at least two coils (e.g., the schematically shown coils 7.1 and 7.2), which may be configured either to transmit and receive radio-frequency signals or only to receive the radio frequency signals (e.g., MR signals).

In order to acquire MR data from an examination object U (e.g., a patient or a phantom), the examination object U is introduced on a bed B into the measurement volume of the MR data acquisition scanner 2. A slab S is an example of a 3D slab of the examination object, from which MR data may be acquired using a method according to an embodiment. The control computer 9 centrally controls the magnetic resonance apparatus 1, and may control the gradient coil arrangement 5 with a gradient controller 5' and the radio-frequency antenna 7 with a radiofrequency transmit/receive controller 7'. The radio-frequency antenna 7 has multiple channels corresponding to the multiple coils 7.1, 7.2 of the coil arrays, in which signals may be transmitted or received. The radio-frequency antenna 7 together with its radiofrequency transmit/receive controller 7' is responsible for generating and radiating (e.g., transmitting) a radio-frequency alternating field for manipulating nuclear spins in a region to be examined (e.g., in the slab S) of the examination object U. The control computer 9 also has an imaging protocol processor 15 that determines a reordering pattern according to an embodiment. A control unit 13 of the control computer 9 is configured to execute all the controls and computation operations required for acquisitions. Intermediate results and final results required for this purpose or determined in the process may be stored in a memory 11 of the control computer 9. The units shown may not necessarily be considered as physically separate units, but simply represent a subdivision into functional units, which may also be implemented by fewer physical units, or just one. A user may enter control commands into the magnetic resonance apparatus 1 and/or view displayed results (e.g., image data) from the control computer 9 via an input/output interface E/A. A non-transitory data storage medium 26 may be loaded into the control computer 9, and may be encoded with programming instructions (e.g., program code) that cause the control computer 9, and the various functional units thereof described above, to implement any or all embodiments of the method, as described herein.

Figure 2:
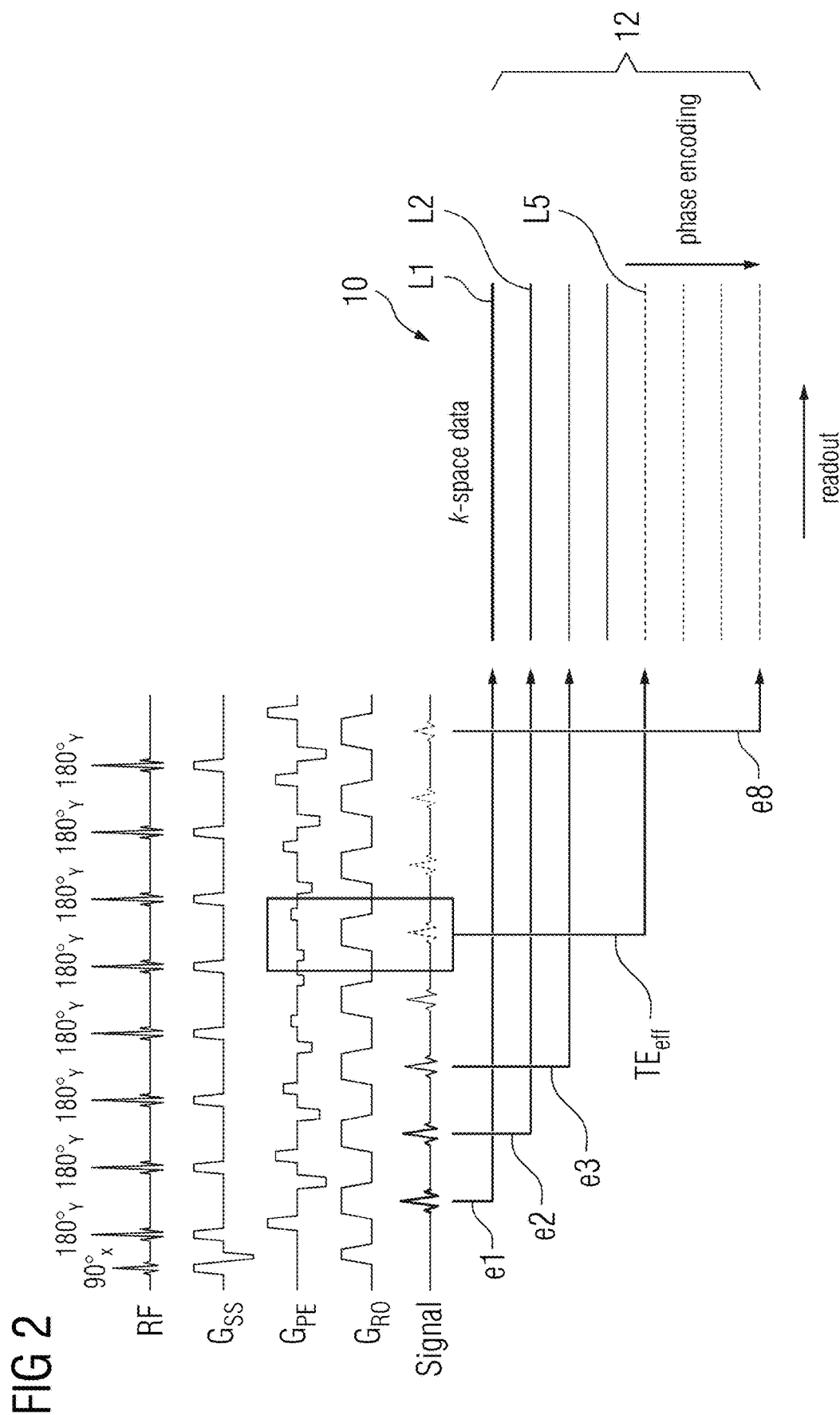
FIG. 2 is a sequence diagram of a Turbo (Fast) spin-echo imaging protocol.

FIG. 2 shows a sequence diagram illustrating a Fast Spin-Echo sequence, in which a 90° pulse is followed by a train of 180° refocusing pulses, as shown on the line names "RF". For illustration purpose, this a 2D sequence; therefore, the RF pulses are transmitted concurrently with a slice select gradient $G_{ss}$. The train of refocusing RF pulses leads to an echo train e1, e2, e3, . . . show in the signal row. Each of these echoes is used to acquire one k-space line 12 in the two-dimensional k-space 10, where echo e1 corresponds to line L1, echo e2 corresponds to line L2, echo e3 corresponds to k-space line L3, etc. In order to distribute the k-space lines 12 around the two-dimensional k-space 10, phase encode gradients GPE are used, which are incrementally changed for each echo. During acquisition, a readout gradient GRO is applied. The echoes e1, e2, . . . , e8 have a signal intensity that diminishes over the echo train due to T2 relaxation. The contrast of the final image is determined by the echo that is acquired in the center of k-space (e.g., e5 corresponding to L5). The time after the 90° pulse of this echo determines the effective echo time $TE_{eff}$.

If a Fast Spin-Echo imaging protocol is performed in 3D, the slice select gradient may be applied only once during the 90° pulse in order to select one slab S. The further slice select gradients are replaced by a further phase encode gradient in a direction orthogonal to the 2D phase encode and the slice select gradient, so that phase encoding is performed in two spatial directions, leading to the distribution of the k-space lines 12 across a volume, rather than a plane 10.

Figure 3:
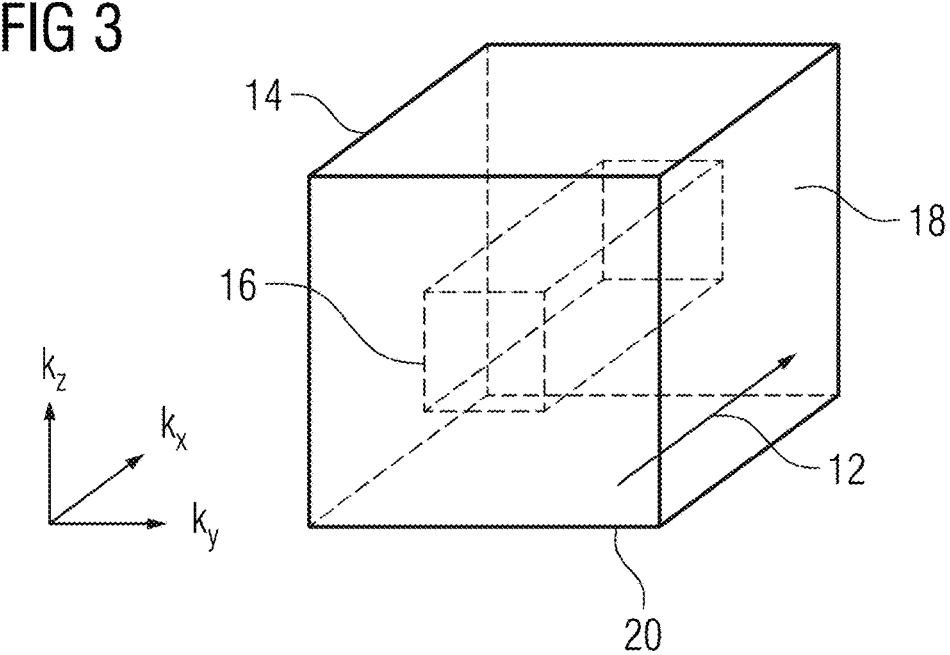
FIG. 3 is a schematic representation of three-dimensional k-space.

FIG. 3 illustrates such three-dimensional k-space 14 having directions $k_x$ in readout direction, and directions $k_y$ and $k_z$ in the phase encode plane 20. A k-space line acquired during one echo is illustrated at 12. The k-space volume 14 is divided into a calibration region 16 and a periphery 18. Since the full acquisition in readout direction does not cost additional imaging time, usually the calibration region 16 will extend along the full length of the volume in readout direction $k_x$. However, in the phase encode plane 20, which in this illustration, is oriented in the plane of the paper, the calibration region 16 covers only about ⅑ of the total square phase encode plane 20. The illustrated k-space line 12 is in the periphery 18.

Figure 4:
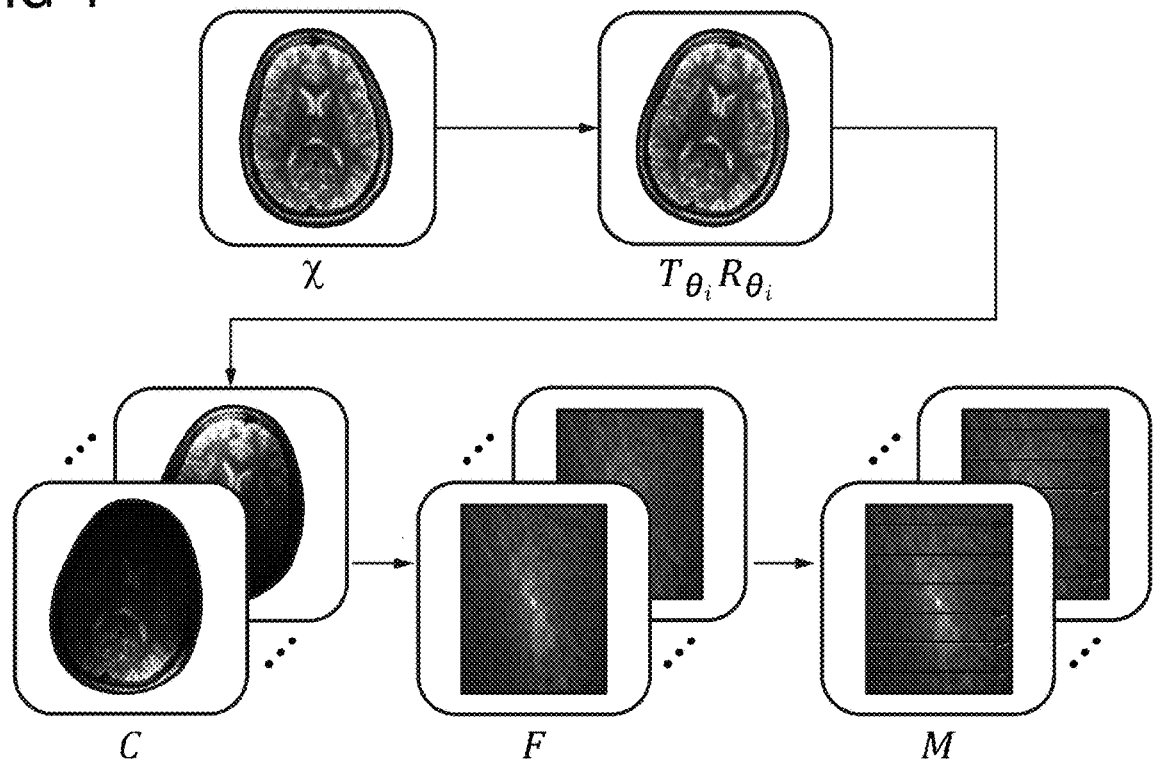
FIG. 4 is a schematic representation of aspects of a retrospective motion correction technique.

A retrospective motion correction technique will now be illustrated with reference to FIG. 4. The mathematical model used is an extension of SENSE parallel imaging, as described in the above-cited paper by K. P. Pruessmann et al., with rigid-body motion parameters included into the forward model. The encoding operator $E_\theta$ for a given patient motion trajectory θ relates the motion free image x to the acquired multi-channel k-space data s. FIG. 4 illustrates the mathematical components that contribute to the encoding at each shot. For each shot i, a position of the subject is described by a new set of six rigid-body motion parameters $\theta_i$ that describe the 3D position of the object. Accordingly, the multi-channel k-space data $s_i$ for a given shot i may be related to the 3D image volume x through image rotations $R_i$, image translations $T_i$, coil sensitivity maps C, Fourier operator F, and under-sampling mask $M_i$ by the following formula 1

$$s_i = E_{\theta_i} x = M_i F\ C\ T_{\theta_i} R_{\theta_i} x \quad [1]$$

Using an ultra-fast low-resolution scout scan, the method according to an embodiment creates an efficient method for directly estimating the motion trajectory θ, thus completely avoiding time-consuming alternating optimization between the image vector (formula 2) and the motion vector (formula 3):

$$[\hat{x}] = \mathrm{argmin}_x \|E_\theta x - s\|_2 \quad [2]$$

$$[\hat{\theta}] = \mathrm{argmin}_\theta \|E_\theta \hat{x} - s\|_2 \quad [3]$$

Prior art methods require repeated updates of the coupled optimization variables x and θ, using the formulas 2 and 3. This may lead to convergence issues as updates of x and θ will be computed on inaccurate information. Further, the reconstruction is computationally demanding, as repeated updates of x (e.g., millions of imaging voxels) are to be provided.

If, however, a low-resolution scout image is acquired, the scout x̃ approximates the motion-free image volume x̂, and each motion state may be determined independently by minimizing the data consistency error of the forward model:

$$[\hat{\theta}_i] = \mathrm{argmin}_{\theta_i} \|E_{\theta_i} \tilde{x} - s_i\|_2 \quad [4]$$

For the final image reconstruction, the individual motion states from each shot are combined, and the motion-mitigated image is obtained from solving a standard least-squares problem:

$$[\hat{x}] = \mathrm{argmin}_x \|E_\theta x - s\|_2 \quad [5]$$

This strategy completely avoids the difficult non-linear and non-convex joint optimization that contains millions of unknowns, as the strategy only considers six rigid body parameters per motion optimization, and the strategy does not require computationally costly full or partial updates to the image.

This framework may also be extended to Wave-CAIPI encoding. This method exploits available information in modern multi-channel receivers and may provide up to R=9-fold speedup for many important clinical contrasts. The sinusoidal gradients in Wave-encoding lead to a spatially varying phase that is applied along the read-out in hybrid space. The notation from the encoding model of formula [1] may be used $$E_{\theta_i} = M_i F_{yz} P_{yz} F_x C T_{\theta_i} R_{\theta_i} \quad [6]$$

where the Fourier transform has been modified to contain the Wave point-spread-function $P_{yz}$.

Figure 5:
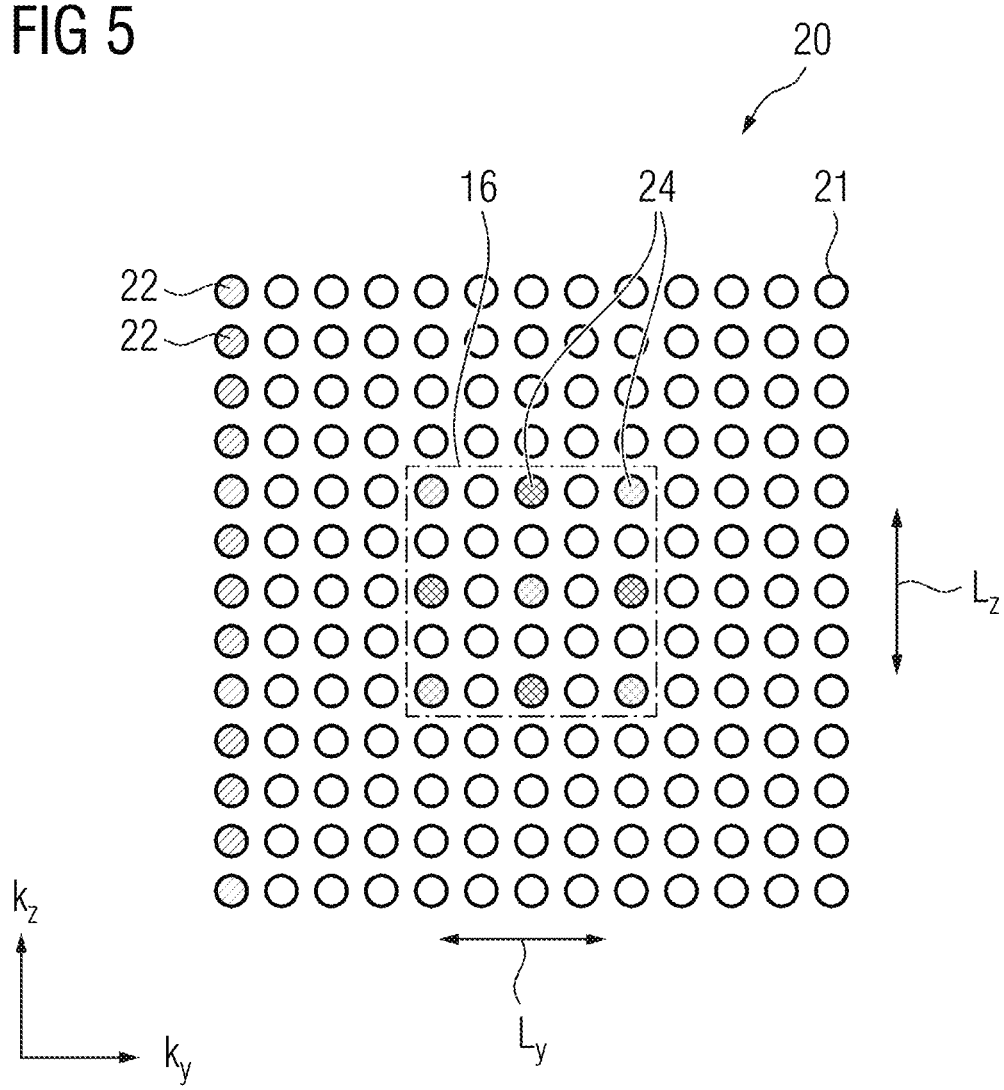
FIG. 5 is a schematic plan view of the phase-encode plane.

FIG. 5 shows a schematic plan view of the phase-encode plane 20 with each k-space line represented by one circle 21. The filled circles 22, 24 illustrate all k-space lines acquired in one shot. According to the imaging protocol, a linear echo train 22 is acquired, thereby sampling all k-space lines along one column in $k_z$ direction. In the same echo train, a number of additional k-space lines 24 are acquired from within the calibration region 16, which has an extent of $L_y \times L_z = 5 \times 5$ in the phase-encode plane. In this example, one out of 4 k-space lines within the calibration region are sampled by the additional k-space lines 24, corresponding to a sampling density of 25%. This is because, as shown in the further data, even the smaller sampling density has proven to be sufficient.

Figure 6:
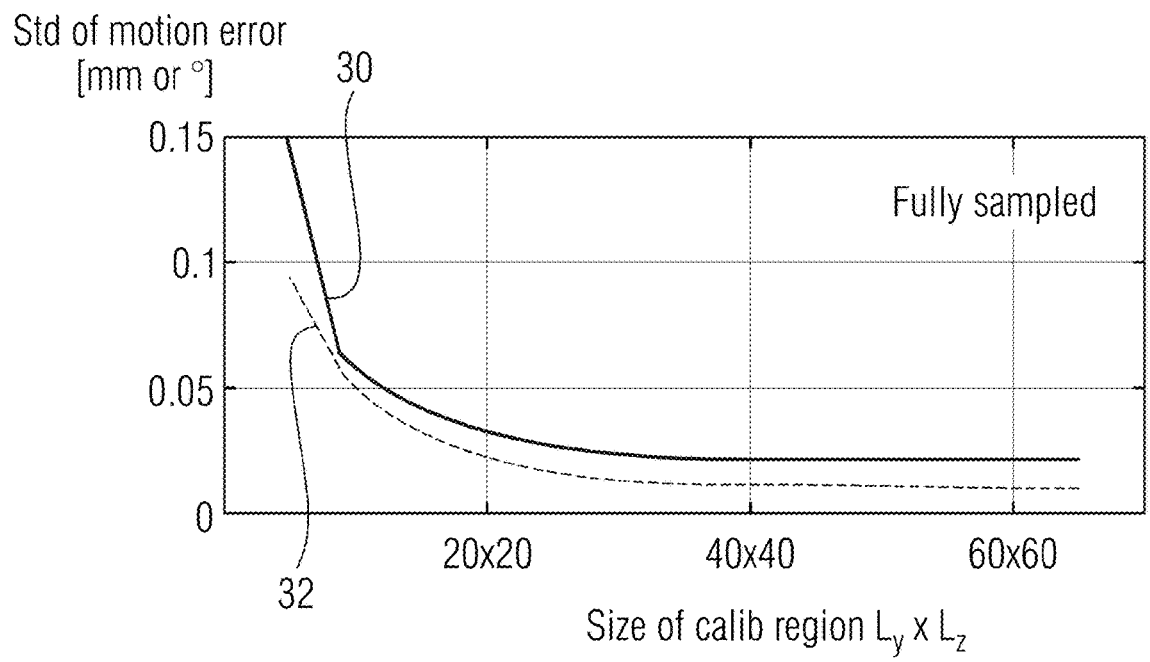
FIG. 6 is an exemplary diagram regarding a motion error depending on a size of a calibration region.
Figure 7:
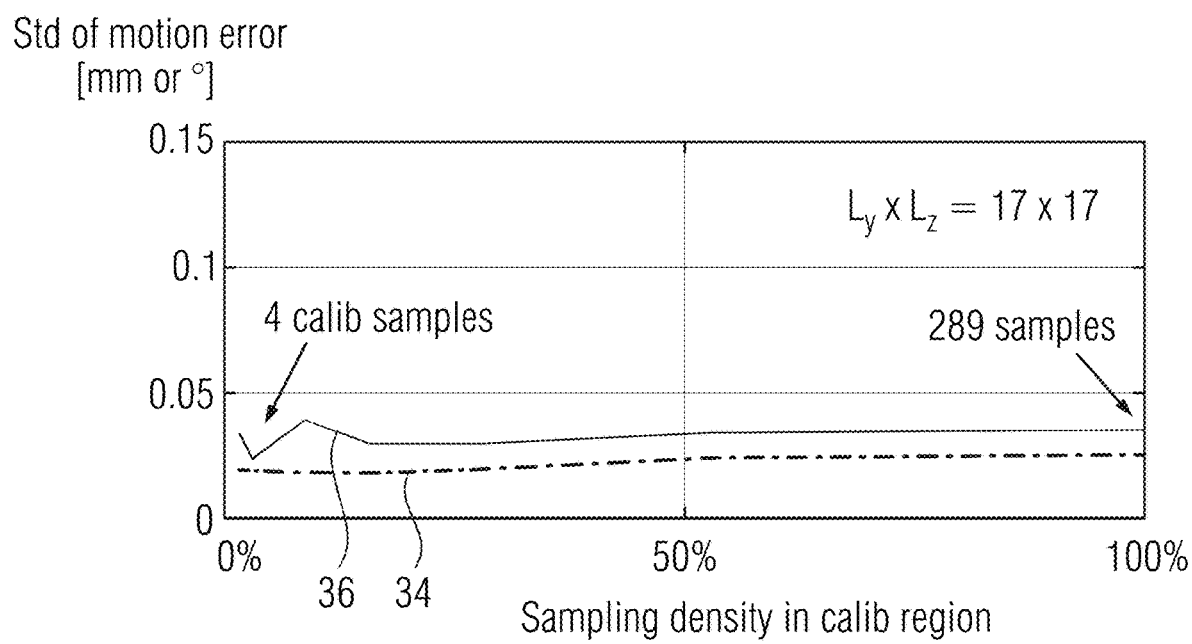
FIG. 7 is an exemplary diagram regarding a motion error depending on a sampling density.

Looking at FIG. 6, the standard deviation Std of the motion error for translational movement 32 (in mm) or rotational movement 30 (in °) is illustrated depending on the size of the calibration region 16, in number of samples. This data was obtained using two motion-free MPRAGE scans that were combined to construct motion data sets that mimicked a single movement from the first motion state to the second motion state in the middle of the imaging protocol, and where the movement included translational and rotational motion. The MPRAGE scans were combined to reconstruct k-space data with various sizes of the calibration region, as well as sampling density in the calibration region (see FIG. 7). FIG. 7 shows the standard deviation of the motion error (e.g., translational 34 and rotational 36) for a fixed size of the calibration region of $L_y \times L_z = 17 \times 17$, so that a maximum number of 289 additional k-space lines may be acquired within the calibration region. The overall size of the data set was 256×256 k-space lines in the phase-encode plane. As take, from FIG. 6, both the rotational error 30 as well as the translational error 32 increased sharply when the size of the calibration region was reduced to below 10×10. However, an increase beyond 20×20 and, for example, 30×30 gave little further improvement. Thus, the calibration region may cover between about 0.15% to 0.6% or 1.4% of k-space and still yield a significant improvement in motion correction. As taken form FIG. 7, the standard deviation of the motion error was remarkably independent from the sampling density, and even a small number of only 4 calibration samples within the calibration region provides good results. Thus, a sampling density of about 1% to 3.33% (e.g., 1.33% to 2%) corresponding to an acceleration factor of between about 30 to 100 (e.g., 50 to 75) may be used in the method of the present embodiments.

While the present disclosure has been described in detail with reference to certain embodiments, the present disclosure is not limited to those embodiments. In view of the present disclosure, many modifications and variations would present themselves, to those skilled in the art without departing from the scope of the various embodiments of the present disclosure, as described herein. The scope of the present disclosure is, therefore, indicated by the following claims rather than by the foregoing description. All changes, modifications, and variations coming within the meaning and range of equivalency of the claims are to be considered within the scope.

It is to be understood that the elements and features recited in the appended claims may be combined in different ways to produce new claims that likewise fall within the scope of the present disclosure. Thus, whereas the dependent claims appended below depend from only a single independent or dependent claim, it is to be understood that these dependent claims may, alternatively, be made to depend in the alternative from any preceding or following claim, whether independent or dependent, and that such new combinations are to be understood as forming a part of the present specification.

The invention claimed is:

1. A method for acquiring a magnetic resonance image dataset of an object, the method comprising:
using an imaging protocol in which spatial encoding is performed using phase encoding gradients along at least one spatial dimension, and frequency encoding gradients along another spatial dimension,
wherein k-space is sampled during an acquisition in a plurality of k-space lines oriented along a frequency encoding direction,
wherein a number of k-space lines of the plurality of k-space lines are acquired in one shot, the imaging protocol comprising a plurality of shots,
wherein a plurality of additional k-space lines are acquired in at least a subset of shots of the plurality of shots, such that movement of the object is detected throughout the imaging protocol, and
wherein the k-space is sampled in a sampling order in which one more of the phase encoding gradients are changed incrementally from one k-space line to the next, with the exception of the plurality of additional k-space lines.

2. The method of claim 1, wherein a position in k-space of the plurality of additional k-space lines acquired in each shot of the plurality of shots or in each of the subset of shots is constant or is varied over the shots or the subset of shots.

3. The method of claim 1, wherein the plurality of additional k-space lines are acquired in each shot of the plurality of shots.

4. The method of claim 1, wherein 2 to 16 additional k-space lines are acquired in each shot of the plurality of shots or in each of the subset of shots.

5. The method of claim 4, wherein 4 to 8 additional k-space lines are acquired in each shot of the plurality of shots or in each of the subset of shots.

6. The method of claim 1, wherein the acquisition of the plurality of additional k-space lines takes up 0.5% to 5% of a total acquisition time of the imaging protocol.

7. The method of claim 6, wherein the acquisition of the plurality of additional k-space lines takes up 1% to 3% of the total acquisition time of the imaging protocol.

8. The method of claim 1, wherein the plurality of additional k-space lines are disposed in a central region of the k-space, which is equivalent to a magnetic resonance image of low resolution.

9. The method of claim 8, wherein the magnetic resonance image of low resolution has a pixel size of ≥3 mm.

10. The method of claim 9, wherein the magnetic resonance image of low resolution has a pixel size of ≥4 mm.

11. The method of claim 1, further comprising acquiring a low-resolution scout image of the object.

12. The method of claim 1, wherein the imaging protocol uses a parallel imaging technique, in which one or all phase encoding directions are subsampled by a predetermined acceleration factor, and the magnetic resonance image dataset is acquired using a multi-channel coil array.

13. The method of claim 1, further comprising:
generating a motion-corrected magnetic resonance image dataset of the object, the generating comprising:
receiving k-space data acquired using the imaging protocol; and
estimating the motion-corrected magnetic resonance image dataset and rigid-body motion parameters for each shot of the plurality of shots or each of a subset of shots, the estimating comprising minimizing a data consistency error between the k-space data acquired in the imaging protocol and a forward model,
wherein the forward model includes effects of rigid-body motion for each shot and Fourier encoding.

14. The method of claim 13, wherein the forward model further includes subsampling, coil sensitivities, or subsampling and coil sensitivities of a multi-channel coil array.

15. The method of claim 14, further comprising receiving a low-resolution scout image of the object,
- wherein minimizing the data consistency error comprises:
  - estimating the rigid-body motion parameters for each shot using the low-resolution scout image and k-space lines acquired in at least a subset of shots; and
  - estimating the motion-corrected image using the estimated rigid-body motion parameters.

16. The method of claim 15, wherein the k-space lines are not used in the estimating of the motion-corrected image.

17. A magnetic resonance imaging apparatus comprising:
- a radio frequency controller configured to drive a radio frequency (RF) coil comprising a multi-channel coil array;
- a gradient controller configured to control gradient coils;
- a controller configured to control the radio frequency controller and the gradient controller to execute an imaging protocol, the execution of the imaging protocol comprising:
  - use of the imaging protocol, in which spatial encoding is performed using phase encoding gradients along at least one spatial dimension, and frequency encoding gradients along another spatial dimension,
  - wherein k-space is sampled during an acquisition in a plurality of k-space lines oriented along a frequency encoding direction,
  - wherein a number of k-space lines of the plurality of k-space lines are acquired in one shot, the imaging protocol comprising a plurality of shots,
  - wherein a plurality of additional k-space lines are acquired in at least a subset of shots of the plurality of shots, such that movement of the object is detected throughout the imaging protocol, and
  - wherein the k-space is sampled in a sampling order in which one more of the phase encoding gradients are changed incrementally from one k-space line to the next, with the exception of the plurality of additional k-space lines.

18. A non-transitory computer-readable storage medium that stores instructions executable by one or more processor to acquire a magnetic resonance image dataset of an object, the instructions comprising:
- using an imaging protocol in which spatial encoding is performed using phase encoding gradients along at least one spatial dimension, and frequency encoding gradients along another spatial dimension,
- wherein k-space is sampled during an acquisition in a plurality of k-space lines oriented along a frequency encoding direction,
- wherein a number of k-space lines of the plurality of k-space lines are acquired in one shot, the imaging protocol comprising a plurality of shots,
- wherein a plurality of additional k-space lines are acquired in at least a subset of shots of the plurality of shots, such that movement of the object is detected throughout the imaging protocol, and
- wherein the k-space is sampled in a sampling order in which one more of the phase encoding gradients are changed incrementally from one k-space line to the next, with the exception of the plurality of additional k-space lines.

\* \* \* \* \*